United States Patent [19]
Williamson et al.

[11] Patent Number: 5,910,720
[45] Date of Patent: Jun. 8, 1999

[54] CROSS-SHAPED TORSIONAL SPRING

[75] Inventors: Matthew M. Williamson, Boston; Gill A. Pratt, Lexington, both of Mass.

[73] Assignee: Massachusetts Institute of Technology, Cambridge, Mass.

[21] Appl. No.: 08/897,091

[22] Filed: Jul. 18, 1997

Related U.S. Application Data

[62] Division of application No. 08/496,419, Jun. 29, 1995, Pat. No. 5,650,704.

[51] Int. Cl.$^6$ .............................. B25J 17/00; H02K 7/10
[52] U.S. Cl. .......................... 318/623; 318/630; 318/632
[58] Field of Search ................................... 318/560–696; 901/20–47; 395/95; 294/106–111; 74/501 M; 73/862.48

[56] References Cited

U.S. PATENT DOCUMENTS

| | | | |
|---|---|---|---|
| 3,098,645 | 7/1963 | Owens | 267/57 |
| 3,207,497 | 9/1965 | Schoonover | 267/57 |
| 4,442,390 | 4/1984 | Davis | 318/663 |
| 4,463,291 | 7/1984 | Usry | 318/254 |
| 4,518,307 | 5/1985 | Bloch | 414/729 |

(List continued on next page.)

OTHER PUBLICATIONS

Isakower, "Design Charts for Torsional Properties of Non–circular Shafts," Technical Report ARMID–TR–78001, ARRADCOM, MISD, DRD–AR–MSA, Dover, NJ, Nov. 1978.
Heglund, "A Simple Design for a Force–Plat to Measure Ground Reaction Forces," *J. exp. Biol.*, vol. 93, pp. 333–338, 1981.
Hanafusa et al., "A Robot Hand with Elastic Fingers and Its Application to Assembly Process," pp. 337–359, *Robot Motion*, Brady et al., MIT Press, Cambridge, MA, 1982.
Howard, "Joint and Actuator Design for Enhanced Stability in Robotic Force Control," Ph.D. thesis, Massachusetts Inst. of Technology, Dept. of Aeronautics and Astronautics, 1990.
Hashimoto et al., "An instrumented compliant wrist using a parallel mechanism," *Japan/USA Symposium on Flexible Automation*, vol. 1, pp. 741–744, ASME, 1992.
Sugano et al., "Force Control of the Robot Finger Joint Equipped with Mechanical Compliance Adjuster," *Proc. 1992 IEEE/RSJ Int. Conf. on Intell. Robots & Sys.*, pp. 2005–2013, Jul. 1992.
Pfeffer et al., "Experiments with a Dual–Armed, Cooperative, Flexible–Drivetrain Robot System," *Proc. 1993 IEEE Int. Conf. on Robotics & Automation*, vol. 3, pp. 601–608, May 5, 1993.

*Primary Examiner*—Paul Ip
*Attorney, Agent, or Firm*—Theresa A. Lober

[57] ABSTRACT

The invention provides an elastic actuator consisting of a motor and a motor drive transmission connected at an output of the motor. An elastic element is connected in series with the motor drive transmission, and this elastic element is positioned to alone support the full weight of any load connected at an output of the actuator. A single force transducer is positioned at a point between a mount for the motor and an output of the actuator. This force transducer generates a force signal, based on deflection of the elastic element, that indicates force applied by the elastic element to an output of the actuator. An active feedback force control loop is connected between the force transducer and the motor for controlling the motor. This motor control is based on the force signal to deflect the elastic element an amount that produces a desired actuator output force. The produced output force is substantially independent of load motion. The invention also provides a torsional spring consisting of a flexible structure having at least three flat sections each connected integrally with and extending radially from a central section. Each flat section extends axially along the central section from a distal end of the central section to a proximal end of the central section.

15 Claims, 12 Drawing Sheets

U.S. PATENT DOCUMENTS

| | | | |
|---|---|---|---|
| 4,532,462 | 7/1985 | Washbourn et al. | 318/372 |
| 4,546,295 | 10/1985 | Wickham et al. | 318/372 |
| 4,546,296 | 10/1985 | Washbourn et al. | 318/372 |
| 4,546,297 | 10/1985 | Washbourn et al. | 318/372 |
| 4,546,298 | 10/1985 | Wickham et al. | 318/372 |
| 4,600,357 | 7/1986 | Coules | 414/730 |
| 4,657,470 | 4/1987 | Clarke et al. | 414/627 |
| 4,843,921 | 7/1989 | Kremer | 64/89.2 |
| 4,865,376 | 9/1989 | Leaver et al. | 294/111 |
| 4,872,803 | 10/1989 | Asakawa | 414/730 |
| 4,921,293 | 5/1990 | Ruoff et al. | 294/111 |
| 4,921,393 | 5/1990 | Andeen et al. | 414/729 |
| 4,989,161 | 1/1991 | Oaki | 364/513 |
| 5,012,591 | 5/1991 | Asakawa | 33/832 |
| 5,049,797 | 9/1991 | Phillips | 318/568.16 |
| 5,062,673 | 11/1991 | Mimura | 294/111 |
| 5,174,168 | 12/1992 | Takagi et al. | 74/89.21 |
| 5,294,873 | 3/1994 | Seraji | 318/568.1 |
| 5,327,790 | 7/1994 | Levin et al. | 73/862.325 |
| 5,442,270 | 8/1995 | Tetsuaki | 318/568.22 |
| 5,456,341 | 10/1995 | Garnjost et al. | 188/378 |
| 5,502,363 | 3/1996 | Tasch et al. | 318/568.11 |

— GOAL TORQUE
—·— ACTUAL TORQUE

— GOAL TORQUE
—·— ACTUAL TORQUE

CROSS-SHAPED TORSIONAL SPRING

This application is a divisional of application Ser. No. 08/496,419, filed Jun. 29, 1995, now U.S. Pat. No. 5,650,704.

GOVERNMENT RIGHTS IN THE INVENTION

This invention was made with U.S. government support under contract No. 959333, awarded by the Jet Propulsion Laboratory of the U.S. Department of Energy. The U.S. Government has certain rights in this invention.

FIELD OF THE INVENTION

This invention relates to actuators for use in, for example, robotic applications, and more particularly relates to force generation and control in robotic actuators.

BACKGROUND OF THE INVENTION

Actuation of a robotic element is optimally provided by an actuator that is light weight and low cost and that exhibits capabilities of high power and force or torque generation, shock tolerance, and above all, precise force control and force control stability. Actuators that are overly bulky or heavy put a strain on the other elements of the system within which they reside; the remaining actuators in the system must accommodate the weight with additional power. As robotic and automated systems continue to increase in size, complexity and functionality, the number of system components so too increases, resulting in the need for economically-priced system parts.

In addition, as the modes of interaction between robotic systems and their environments increase in freedom and complexity, high power, high force or torque generation is required to provide capabilities in a wide range of robotic load manipulation tasks. But at the same time, however, the force or torque generation must be precisely controlled to enable interaction with the robot's environment without causing damage to either the environment or the robot. Indeed, shock tolerance is required of robotic actuator systems because the chance of unexpected or unpredictable high-force interactions with task and load manipulation environments is greatly increased in such complex applications.

Heretofore these actuator attributes have been in contradiction. For example, to achieve a decrease in actuator weight, gears are conventionally introduced in an actuator employing a motor. Although a gear train does lighten the system by allowing for use of a smaller motor operating at higher speeds, it also sensitizes the system to shock loads; shock-induced damage of gear trains is known to be one of the most common modes of actuator failure. In an effort to enhance gear train strength to reduce gear damage, precise materials and designs are often employed for gear systems. Typically such systems are prohibitively expensive and therefore are not acceptable for common robotic actuation applications. As a result, design efforts toward a strong, inexpensive, light weight, shock resistant actuator that provides precise force control have been suboptimal.

SUMMARY OF THE INVENTION

The invention provides an actuator that overcomes limitations of conventional actuators to achieve precise force control with a strong, inexpensive, light weight and shock resistant actuator design.

In accordance with the invention, in one aspect, there is provided an elastic actuator consisting of a motor and a motor drive transmission connected at an output of the motor. An elastic element is connected in series with the motor drive transmission, and this elastic element is positioned to alone support full weight of any load connected at an output of the actuator. A single force transducer is positioned at a point between a mount for the motor and an output of the actuator. This force transducer generates a force signal, based on deflection of the elastic element, that indicates force applied by the elastic element to an output of the actuator. An active feedback force control loop is connected between the force transducer and the motor for controlling the motor. This motor control is based on the force signal to deflect the elastic element an amount that produces a desired actuator output force. The produced output force is substantially independent of load motion.

Unlike conventional actuators, the elastic actuator of the invention provides force generation and control directly through a series elastic element that itself supports the load of the actuator. This arrangement substantially shields the actuator motor and transmission from shock loads, while at the same time provides the ability to very precisely control force produced by the actuator; indeed, the produced force is substantially independent of any motion of the load. The series elastic element enables an actuator geometry that is elegantly simple, resulting in an actuator system that is light weight, easy to manufacture, and inexpensive. The series elastic element also enables an actuator geometry that is quite strong.

In preferred embodiments, the force transducer consists of a strain gauge, preferably positioned on the elastic element, or a potentiometer. Preferably, the elastic element consists a linear spring or a torsional spring.

In other aspects, the invention provides a torsional spring consisting of a flexible structure having at least three flat sections each connected integrally with and extending radially from a central section. Each flat section extends axially along the central section from a distal end of the central section to a proximal end of the central section.

In preferred embodiments, the torsional spring flexible structure has at least three flat sections each connected integrally with and extending radially from the central section. Preferably, the flexible structure comprises steel and has four flat sections each connected integrally with the central section at a right angle with respect to adjacent flat sections. In other preferred embodiments, the torsional spring includes a first mounting block integrally connected with the distal end of the central section and a second mounting block integrally connected with the proximal end of the central section. Preferably, the first and second mounting blocks each include a central annulus. In other preferred embodiments, the torsional spring consists of a cylindrical section extending from the central section proximal end to the central section distal end. The cylindrical section is integrally connected with a radial edge of each flat section.

The elastic actuator and spring provided by the invention are applicable to a wide range of robotics, automation, and actuation applications where, e.g., a robotically actuated arm, hand, leg, or foot interacts with an unstructured and/or unpredictable environment.

Other features and advantages of the invention will be apparent from a description of a preferred embodiment, and from the claims.

DESCRIPTION OF A PREFERRED EMBODIMENT

Figure 1:
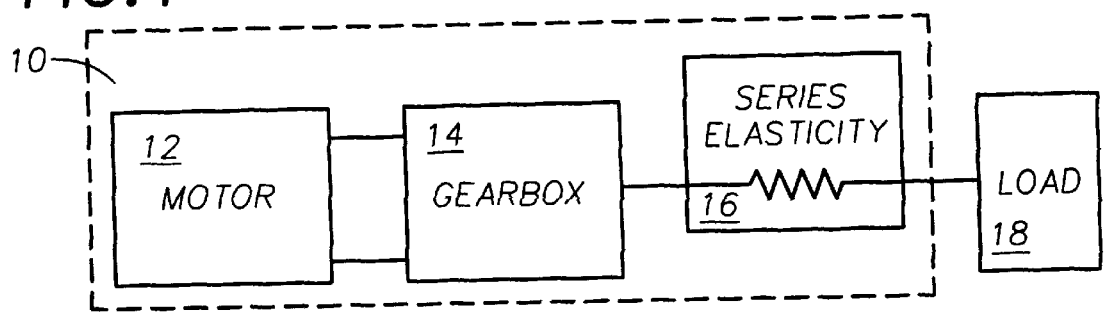
FIG. 1 schematically illustrates the components of an example elastic actuator in accordance with the invention.

FIG. 1 illustrates the fundamental components of an elastic, force-controlled actuator 10 in accordance with the invention. The actuator 10 includes a driving source for force generation, e.g., a motor 12, which may be geared with a geartrain, or gearbox 14. As will be understood by those in the field of actuator design, such a gear train may be integral to the motor source and in any case is not required for all applications. An elastic spring element 16 is linked in series with the output of the gearbox 14, or if no gearbox is employed, is linked in series directly with the motor 12. The load 18 to be manipulated by the actuator 10 is then itself linked in series with the elastic element 16. This elastic spring element introduces at the interface between the actuator 10 and the load 18 a series elasticity that provides the ability to achieve precise control of the force applied to the load, as explained below. The series elastic element may be linked to the load through a transmission element (not shown); such a transmission element must, however, be characterized as a back-driveable, low friction, low backlash transmission.

In general, precise force control is accomplished in the actuator by way of controlling the series elastic element such that a desired force output of the actuator is developed by the spring. As will be shown, this control scheme provides for more accurate, more stable, and less noisy force control than is achieved by conventional, stiff actuators. In addition, the series elastic element acts as a low pass filter to shock loads, thereby protecting the gearbox and motor from damage. The strength of gear teeth is quite often the factor limiting the strength of conventional actuators. This limitation is inherently compounded by the reducing action of the gearbox; the gear reduction increases the effective inertia of the motor, whereby large forces can result from shock loads. Indeed, gearbox failures due to this effect are common for conventional actuators. The series elastic element low-pass filters such shock loads before they reach the gearbox, whereby the motor and the gearbox are largely isolated from shock.

Figure 2:
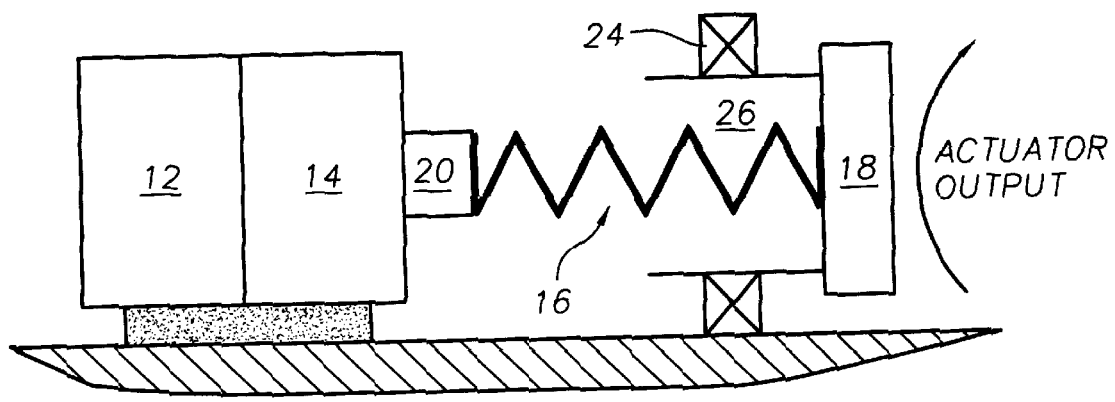
FIG. 2 schematically illustrates the actuator of FIG. 1 in more detail.

A first embodiment of the elastic actuator is shown in FIG. 2. It consists of a motor and gearbox 12, 14, having an output shaft 20 connected directly to a torsion spring 16. The motor may be outfitted with an encoder (not shown) if desired for a specific application; such an encoder is not, however, required for the actuator control system of the invention. One suitable motor and gearbox is the MicroMo 3557K motor and MicroMo 30/1 gearbox, which may both be obtained from MicroMo, Inc. Preferably, the motor exhibits a high torque-to-current ratio, a high maximum current and stall torque, good heat dissipation, low mass, and low friction from brushes, etc. However, for any motor employed, the performance of the elastic actuator always exceeds the performance of the motor system; a motor system of any quality is thus accommodated by the actuator. The transmission, e.g., the motor gearbox, is preferably compact, and preferably exhibits low backlash. The gearbox output is preferably of a high torque rating. While as explained above the spring acts to insulate the gearbox and motor from shock loads, thereby accommodating a gearbox transmission of poor quality, a high quality transmission is nevertheless preferred.

The torsion spring is mounted between bearings (not shown) on the motor gearbox and shaft and the actuator output element 18. This output element is supported in a bearing 24, the spring passing through the center of the bearing axle 26 to conserve space requirements for the actuator system.

Considering the particular geometry and properties of the torsional spring element, such a spring may be constructed of, e.g., steel, aluminum, delrin, or nylon 66, or other suitable material. Preferably, the spring is an integral structure that is light-weight and compact, and exhibits a desired stiffness for a given application. Note that the spring actually carries the actuator load; as a result, the spring optimally is of a high loadcarrying capacity, or at least a carrying capacity suitable for a given load application. In addition, it is preferable that the spring exhibit no hysterisis, i.e., no energy loss per compression cycle, and that the spring be of a geometry that is easy to attach between the actuator driving mechanism and the actuator load element.

While the torsion spring element may embody any convenient geometry, it is preferable that the spring embody a cross shape, flat plate shape, or composite plate shape. It is found that for torsion, cylindrical springs are too efficient, i.e., a given cylindrical spring design that attains a desired strength is too stiff. FIG. 3 illustrates various preferably spring designs. In a first composite plate spring 30, shown in FIG. 3A, strips of shim steel 32, i.e., hardened steel strips, are fastened by way of clamps (not shown) to form an interconnected stack of plates. Each plate 32 is of a thickness t, a width b, and a length l. The yield angle of the composite spring overall is a function of t and l; thus, the spring stiffness is altered by adjusting the width of the strips and the number of strips used.

One example composite plate spring consists of 6 strips having a width of 0.55", a length of 1.9", and a thickness of 0.032". Spacers each having a thickness of 0.01" are placed between the strips to prevent them from rubbing against each other. The force produced by such a spring is roughly a linear function of the twist angle of the stack, and may exhibit a small degree of hysteresis. Because the outermost spring strips are in a combination of tension and torsion, rather than pure torsion, the composite stack spring is found to exhibit a higher degree of stiffness than theoretically predicted.

Figure 3A:
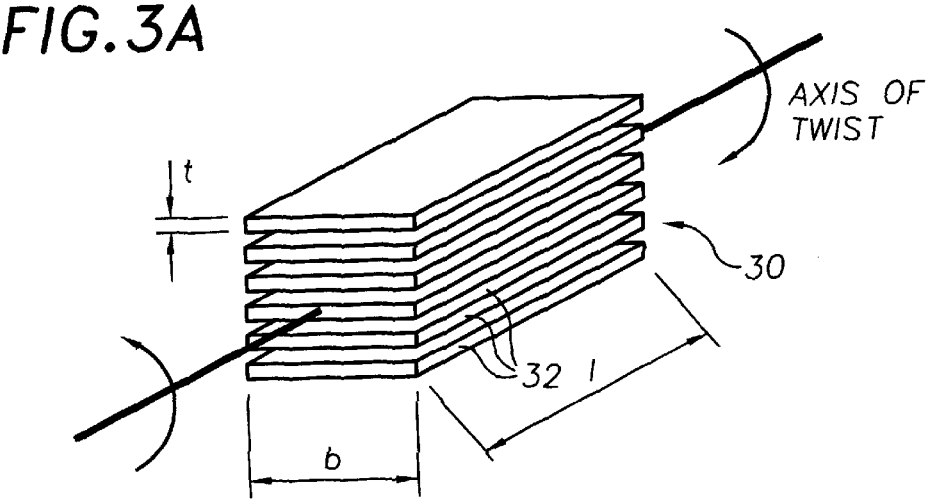
FIGS. 3A–3F schematically illustrate examples of torsion springs provided by the invention.
Figure 3B:
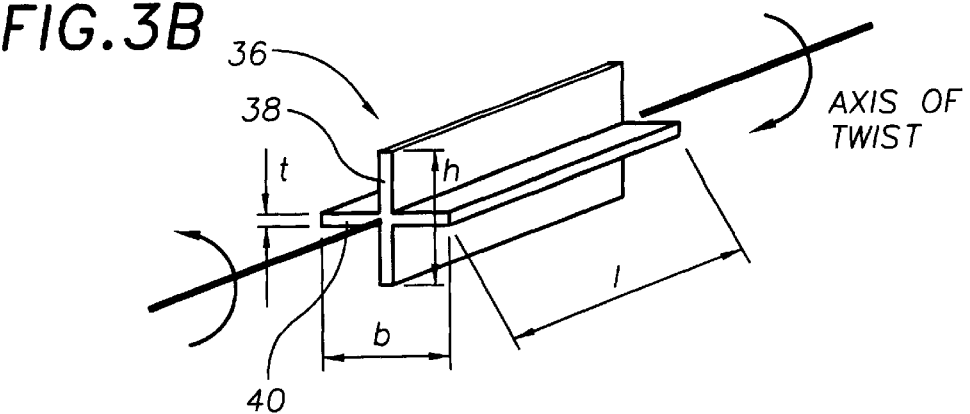
Figure 3C:
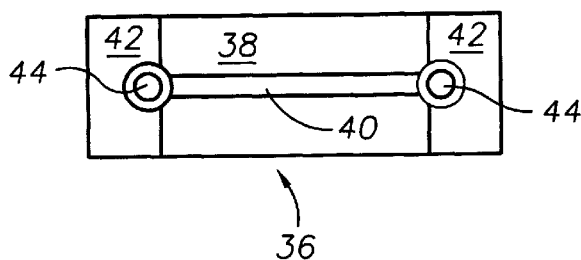
Figure 3D:
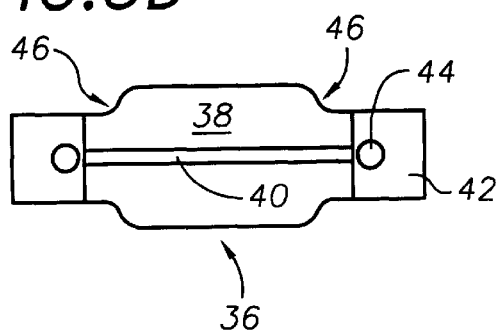

An integral spring structure in accordance with the invention that for some applications may be preferable to this composite spring stack is shown in FIGS. 3B–3D. This integral spring design consists of an integral cross spring 36, made up of a vertical sheet 38, of thickness t and height h, which intersects a horizontal sheet 40, of width b and thickness t, at its center. The vertical and horizontal sheets are both of a length l. This integral cross-shaped spring is easy to manufacture and requires no assembly of composite sub-pieces. This provides important advantages because bearings, spacers, or other links needed to hold the pieces of a composite spring structure together absorb energy; the integral spring, in contrast, requires no such links.

The integral cross spring 36 provided by the invention is torsionally flexible but flexurally rigid, meaning that the spring can support a bending load. The spring is also strong, in that it is of a low stiffness but can carry a large load before yielding. The spring is preferably formed of steel, e.g., AISI/SAE 4142, because steel has a definite, predictable yield point, and because steel can be heat-treated, if desired, to produce a specifically desired elastic characteristic for a given application.

The yield angle, maximum torque, and stiffness of the cross spring may be modeled by approximating the cross spring as an equivalent flat plate of width (b+h), length l, and thickness t. The yield angle, $\theta_{max}$, spring stiffness, $k_{spring}$, and maximum torque, $T_{max}$, are then given, respectively, as:

$$\theta_{max} = \frac{l\tau_{max}}{tG} \quad (1)$$

$$k_{spring} = \frac{(b+h)t^3 G}{3l}$$

$$T_{max} = k\theta_{max},$$

where $\tau_{max}$ is the maximum shear stress accommodated by the spring and G is the shear modulus of the spring material.

While it is found that the integral cross spring does indeed obey these general relationships, the cross spring exhibits a slightly lower stiffness than is predicted. This is due to the fact that in the cross spring an appreciable amount of the spring material is located near to the spring's twist axis, which inherently results in reduction of stiffness. The cross spring is similarly found to withstand a larger maximum angle of twist than is predicted. The stiffness and maximum allowable twist angle determine the maximum torque that can be carried by the spring. Although the stiffness is found to be less than predicted, the increased maximum twist angle results in a maximum torque capability that is greater than that of a flat plate by a factor of about 1.6. This increased torque capability, together with its compact design, makes the integral cross spring uniquely well-suited for use in an elastic actuator system.

Preferably, the corners of the cross shape of the spring are machined to be sharp. This consideration is required because a section of the spring will yield more easily if there is too large a radius at the center. In addition, the sharp corners act to limit the mass in the center of the spring. If the amount of mass in the center of the cross is larger than a critical mass, the cross spring behaves like a rod, whereby the disadvantages associated with a conventional cylindrical spring, e.g., high stiffness and low yield, are produced.

Referring to FIGS. 3C and 3D, the integral cross spring of the invention may be machined to provide flat end pieces with holes or other geometry for fastening the spring to, e.g., the motor and the load in an actuator system. In one such geometry, the cross spring 36 includes rectangular end portions 42. As shown in FIG. 3D, the cross-shaped section may be tapered at sloping corners 46 to define end portions 42 that are more narrow than the spring center section. A central hole 44 may be formed in either or both of the rectangular ends for providing a grasping mechanism.

The end portions 42 of the integral cross spring 36 both support the ends of the cross shape and transfer the load to the spring; they also provide a very convenient means for grasping and fastening the spring to a load member. As a practical matter, the end portions also provide an anchor means for holding on to as the central cross geometry of the spring is machined during manufacture.

Figure 3E:
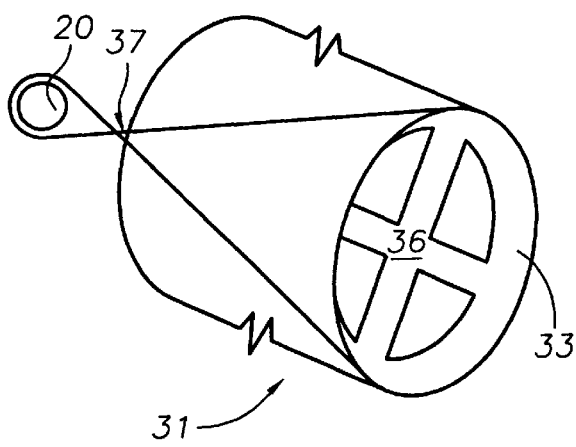
Figure 3F:
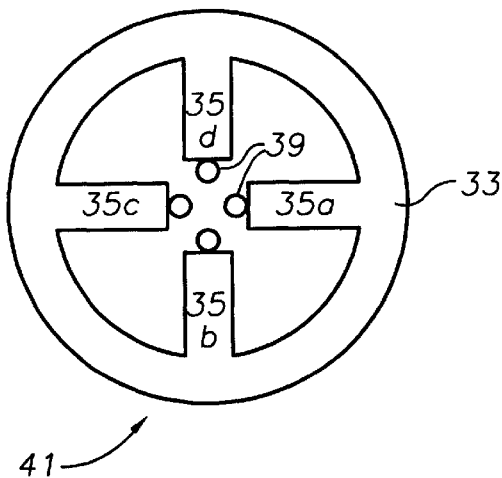

In variations of the integral cross spring of the invention, the cross-shaped section may be machined out of a circular section or other geometric shape. For example, as shown in FIG. 3E, the cross-shaped section 36 may be an integral geometric structure machined out of a rod to form a cross-shape integrally connected with an outer hollow cylinder 33. This cylinder/cross spring structure may be connected to a motor drive transmission 20 by, e.g., a cable arrangement 37; and may be connected to other elements at the radially central point of the cross section by way of, e.g., an end block like that described above. The cylinder/cross spring structure may be further adapted as shown in FIG. 3F. Here, the vertical and horizontal cross sections are machined such that there exists no mass at the center crossing point of the sections. Each section 35a–35d thus is integrally connected only to the outer cylinder section 33.

In other variations of the spring structure of FIG. 3B, the integral spring may consist of more than two flat sections. For example, three or more flat sections may be machined along the length of the spring structure, the sections all crossing through the radial midpoint of the spring. The ease of manufacturability and high strength exhibited by the two-flat cross spring may, for many applications, be found preferable.

Turning now to force sensing and control schemes provided by the actuation system of the invention, the elastic spring element employed in the actuator system acts as both a force generation mechanism and a force sensing mechanism. The linearity inherent in the spring enables a force measurement to be accomplished based on the stretch, or angle of twist, of the spring. In accordance with the invention, the stretch or angle of twist of the spring is measured directly to determine the force being applied by the spring. This technique requires only one sensor, and therefore requires little calibration, while at the same time providing high accuracy through high resolution.

Figure 4:
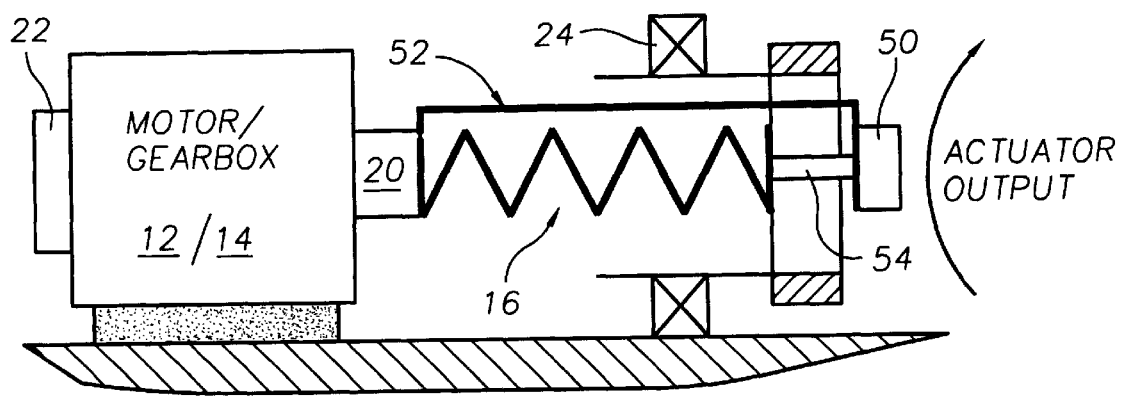
FIG. 4 schematically illustrates the actuator of FIG. 2 including a force sensing mechanism in accordance with the invention.

Referring to FIG. 4, in a first direct spring measurement in accordance with the invention, a potentiometer is employed to produce a resistance parameter correlated to a torsional spring twist. The potentiometer 50 is here connected by way of a potentiometer support 52 to the motor shaft 20. The shaft 54 of the potentiometer is directly connected to the end of the series spring element 16. A 10kΩ Model 140, precision potentiometer, available from Spectrol, Inc., is one suitable potentiometer. In operation, twist of the torsion spring in response to a driving force on motor shaft results in twist of the potentiometer shaft and a corresponding development of resistance by the potentiometer. A measurement of the resistance in, e.g., a resistive bridge circuit, provides an indication of the spring twist and corresponding spring force.

Figure 5A:
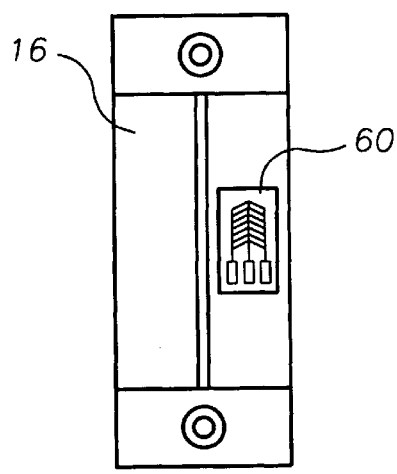
FIGS. 5A and 5B schematically illustrate positioning of strain gauges on a torsion spring in accordance with the invention.

While this potentiometer sensing scheme is adequate for many applications, it has the drawback of requiring precise manual setup and positioning, and can provide only medium resolution of force readings. In an alternative, preferable sensing scheme, shown in FIGS. 5A and 5B, one or more stain gauges are positioned on the integral cross spring to produce an indication of the spring force. In this case, the strain developed as the spring flats twist is measured by the gauge; the force may then in turn be ascertained. The integral cross spring of the invention is particularly well-suited for this type of force measurement because the spring flats provide surfaces on which strain gauges may be easily mounted. For example, as shown in the figures, a strain gauge 60 may be positioned directly on one or more flats and on one or both sides of each flat. This ease of sensor mounting is a unique advantage of the cross spring of the invention.

Figure 5B:
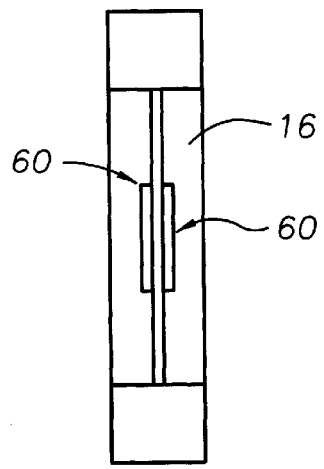

A full bridge strain gauge circuit is provided by placement of a strain gauge on each side of a spring flat, as shown in FIG. 5B. Preferably, the gauges are positioned such that they are aligned with the direction of maximum stress, which is at 45 degrees from the axis of twist for torsion in the integral cross spring. Strain gauges under the model number CEA-06-062UV-350, available from Micro Measurements, are suitable for the force sensing scheme of the invention. A strain gauge conditioner, such as that available from Analog Devices as model 1B31AN may be employed to measure, amplify, and filter the signal produced by the gauges. This signal is then differentiated and sampled for use in the force control scheme of the invention, as explained in detail below.

Although strain gauges are historically known to be difficult to control in noisy environments such as in the vicinity of motors employing pulse-width-modulation driving, this condition is reduced in the actuator system of the invention because in the integral cross spring of the invention, the angle of twist and corresponding spring strain is very large compared to conventional strain gauge applications. As a result, the strain gauge signal does not here require a large amplification factor. In addition, because the integral cross spring is stiff in bending, bending loads on the spring do not have a large impact on the strain readings. In fact, the torsion strains in the spring are found to be an order of magnitude greater than bending strains in the spring. Finally, while the noise of the system may be increased when the signal is differentiated by the force control loop, as discussed below, careful EMI shielding of the system adequately reduces the signal noise to a tolerable level.

The invention is not limited to use of a potentiometer or strain gauge for sensing force. A conventional hall-effect sensor or other type of position transducer that can be mounted directly on the series spring element may be employed as a force transducer. In addition, as will be discussed in detail below, the elastic actuator design accommodates positioning of a force transducer in series with the elements of the transducer at any point along the transducer from the mounting of the motor to the actuator output element. One such transduction scheme is provided by the sensing arrangement suggested by Levin et al. in U.S. Pat. No. 5,327,790, entitled "Reaction Sensing Torque Actuator," the entirety of which is hereby incorporated by reference. All of the force transduction techniques contemplated by the invention provide the ability to measure the force generated by an elastic element using only one transducer which, as explained, provides many control and precision advantages.

Figure 6:
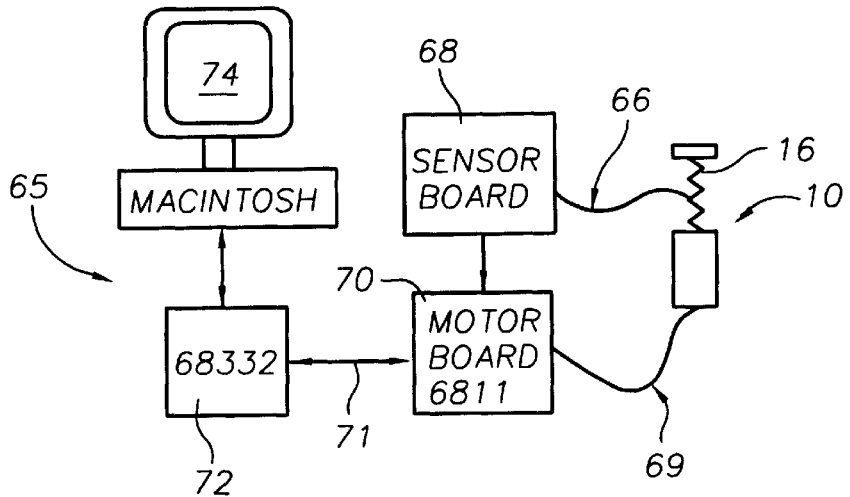
FIG. 6 is a block diagram of the components in the force control system provided by the invention.

Using a strain gauge force sensor, potentiometer force sensor, or other suitable force sensor for directly sensing the stretch of a linear spring or twist of a torsion spring, the elastic actuator of the invention provides a control loop for controlling the force generated by the spring to be applied to a load. Referring to FIG. 6, there is shown the components of one example control loop 65 in accordance with the invention. In operation, the actuator spring 16 generates a force by way of its stretching or twisting action, which is sensed and transduced by, e.g., strain gauges that produce a strain gauge signal 66. This strain gauge signal is passed to a sensor board 68, consisting of circuitry programmed to amplify, filter, and differentiate the strain gauge signal. Preferably, the cut off frequency of the strain gauge amplifier is 2 kHz, and the cut off frequency of the strain gauge differentiator is preferably 100 Hz. These cut off frequencies ensure that there is no significant phase roll off over the working frequency of the actuator, which may typically be between, e.g., 0 Hz and 20 Hz.

The conditioned strain gauge signals are then passed from the sensor board 68 to a motor board 70, which may consist of, e.g., a Motorola 6811 micro-controller. This micro-controller is programmed to control the motor in response to the spring force for generating a desired force. The micro-controller employs, e.g., two analog-to-digital converters that are used to sample the conditioned strain gauge signals. The motor board 70 also includes hardware for sensing the encoder signal 69 of the motor, and further includes a pulse-width-modulation generation circuit and an H-bridge for controlling powering the motor to produce a desired spring stretch and corresponding spring force.

The motor board 70 is connected by way of, e.g., a differentially-driven communication bus 71 to a processor 72, e.g., a Motorola 68332 processor. The processor communicates with the motor board for sending appropriate gain values and set points to the motor board for controlling the motor. The Motorola 6811 micro-controller may be programmed by, e.g., hand coding in assembly language, which may be downloaded from a serially-connected computer 74, e.g., a Macintosh PC. The Motorola 68332 processor communicates with the motor board at a rate of up to 400 Hz. The processor may run on, e.g., the programming language L, a subset of Common Lisp, as detailed in "The L Manual," by R. A. Brooks, IS Robotics, 1994. Data from the actuator may be displayed and analyzed in real-time on the computer 74 as the control loop operates.

Figure 7:
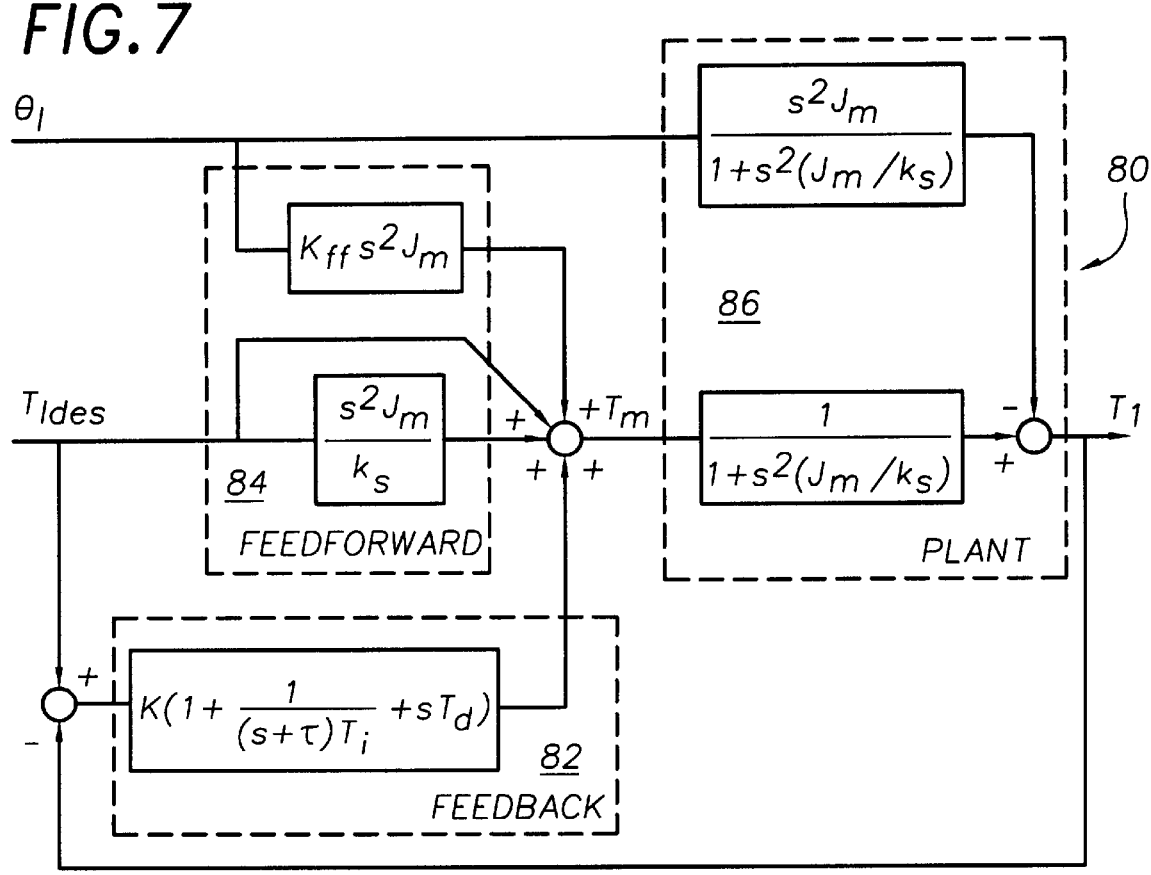
FIG. 7 is a block diagram of the control function components in the system of FIG. 6.
Figure 8:
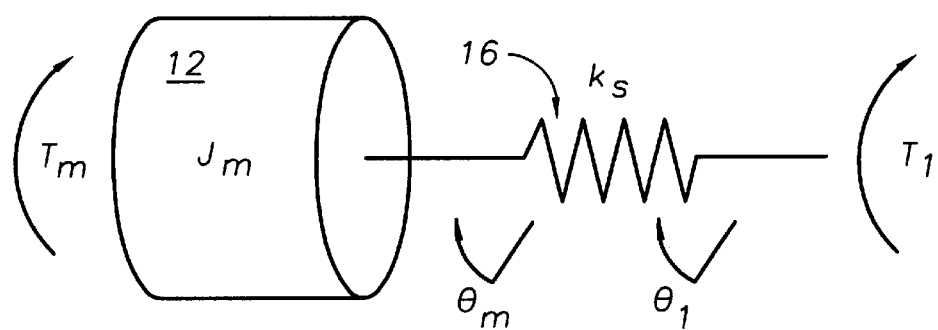
FIG. 8 schematically illustrates a force model for an elastic actuator in accordance with the invention.

Considering now the force control scheme of the invention in more detail, FIG. 7 illustrates the components of a theoretical control loop 80, including a feedback loop 82, a feedforward loop 84, and a feedforward model of the plant 86, or motor-spring system. Each of these loops is explained below. FIG. 8 illustrates a force model on which the control loop is based. The motor mass is here given as $J_m$, the spring stiffness as $k_s$, the force on the motor as $T_m$, and the output force to be applied to a load as $T_l$. The movement of the motor shaft and the movement of the load are given as $\theta_m$ and $\theta_l$, respectively. The forces balanced between the motor and spring may be expressed as:

$$T_m + k_s(\theta_l - \theta_m) = J_m \theta_m'', \qquad (2)$$

and the forces balanced between the load and spring may be expressed as:

$$-k_s(\theta_l - \theta_m) = T_l. \qquad (3)$$

Taking the Laplace transforms of these expressions provides a direct relationship between the force on the motor and the force on the load, as:

$$T_m(s) = \left(1 + \frac{J_m}{k_s}s^2\right)T_l(s) + J_m s^2 \theta_l(s). \quad (4)$$

This expression is employed in the force control scheme to indicate what motor force, or torque, is needed to produce a desired force, or torque, on the load when the load is moving. The expression also defines each of the components of the motor force, which in the control scheme of the invention are in a feedforward section of the control.

If it is assumed that the output of the actuator is clamped, whereby $\theta_l'' = 0$, then the transfer function between the output torque and the motor torque is given as:

$$\frac{T_l}{T_m}(s) = \frac{1}{1 + s^2 J_m / k_s}. \quad (5)$$

This transfer function between the actual output force, $T_l$, and the motor force, $T_m$, has no zeros and two poles on the imaginary axis, at a frequency $\omega = \sqrt{k_s/J_m}$. This frequency corresponds to the natural frequency of the motor mass and series elastic element.

The transfer function between the output force, $T_l$, and the motion of the output shaft, $\theta_l$, as defined in FIG. 8, defines the impedance, Z, of the actuator system, looking from the output of the system. While this transfer function has the same poles as the torque transfer function in expression (5) above, it also has two zeros at the origin. The impedance function is given as:

$$Z(s) = \frac{T_l}{\theta_l}(s) = \frac{-s^2 J_m}{1 + s^2 J_m / k_s}, \quad (6)$$

As shown in FIG. 7, the transfer function in expression (5) between the output torque and motor torque, together with this expression (6) for the system impedance define the system model of the plant 86 to be controlled by the actuator force control scheme.

The feedforward loop is based on a model of how the force on the motor mass must vary to produce an output torque on the load when the output load shaft is moving. This is in fact expressed directly by expression (4) above. The three components on the right side of the expression indicate the three force control components to be determined; namely, the $T_l$ term provides the correct wrap up twisting of the spring, because the force, or torque, to be produced is directly proportional to the twist angle, the $(J_m/k_s)T_l''$ term cancels out the effect of motor mass vibration on the spring, and the $J_m \theta''$ term moves the motor shaft in correspondence with the load output shaft, thereby maintaining a constant spring twist for a given torque level. These control functions are shown in the feedforward block 84 of the control system shown in FIG. 7. Use in the control system of this feedforward loop, for calculating control, in combination with a feedback loop, to compensate for errors in the model and for unmodeled disturbances, provides a closed-loop system that provides better control performance than a control system using a feedback loop alone.

Turning now to the feedback control loop, it is preferable that the actuator control system be stable and passive. This passivity is achieved if the interaction impedance of the system, Z(s), is stable, i.e., has no poles in the right half plane; and if the imaginary part of Z(jw) is negative for all frequencies. These two requirements result in a system that always absorbs energy from the environment and provides no net transfer of energy out of the system, and further that the system impedance is a stable function of frequency.

Because the actuator force control system is second order, a proportional-derivative, PD, or proportional-integral-derivative, PID, controller is preferred for the feedback loop. While a PD controller may be stable under certain conditions, the steady-state error of such a loop is high unless the proportional gain component is set quite high. However, the gain cannot be raised without limit due to noise and the sampling rate of the system controller. As a result, for many applications a PID controller is preferred. The PID loop provides better low-frequency behavior without the need for high gains.

Assuming a PID control of the form $K(1+1/(s+\tau)T_i + sT_d)$, where $T_i$ and $T_d$ are the integral and derivative terms, respectively, and $\tau$ is a time constant for suppressing the integral action at low frequencies, expression (6) above given for system impedance is used to achieve an expression including the PID control as:

$$Z(s) = \frac{T_l}{\theta_l}(s) = \frac{-s^2 J_m k_s}{s^2 J_m + k_s + K(1 + sT_d + 1/(s+\tau)T_i)}. \quad (7)$$

This control law is ensured of meeting the stability criteria given above through selection of the values for K and for the constants $\tau$, $T_i$, and $T_d$. FIG. 7 illustrates the form of the feedback loop 82.

Figure 9:
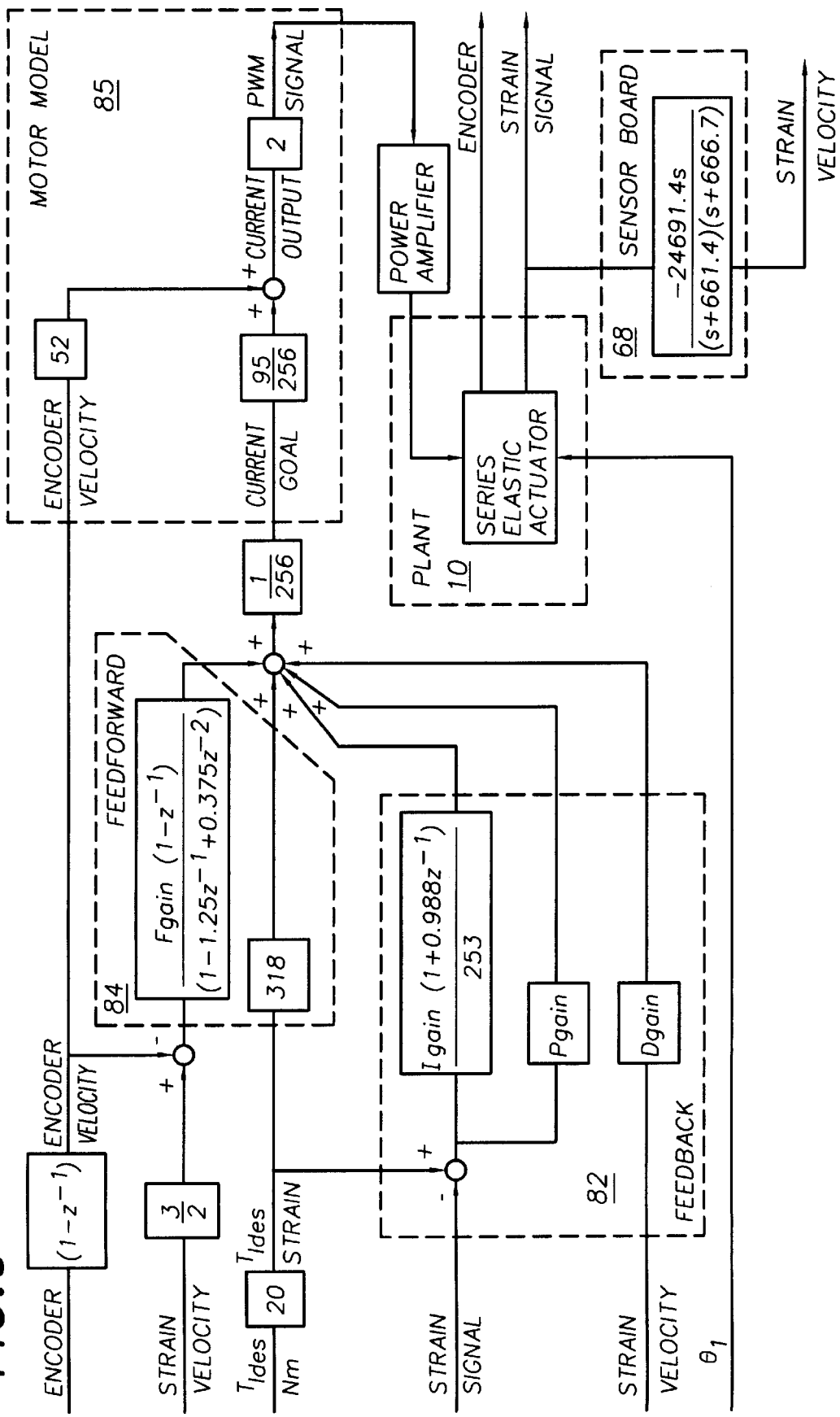
FIG. 9 is a block diagram of the control function components and output parameters of the force control system provided by the invention.

FIG. 9 illustrates a full control system based on the theoretical control system just described for control of the elastic actuator of the invention. The system includes five control functions; namely, a transfer function corresponding to the force sensor signal conditioning on the sensor board 68, a PID feedback transfer function 82 to achieve a desired torque, a feedforward transfer function to achieve a desired torque, a feedforward function to achieve a desired motor output shaft acceleration 84, and a feed forward model of the motor 85.

This system is like the theoretical control system discussed above except for elimination of the term that includes the second differential of the desired force. In operation, it was found that due to difficulty in differentiating very small fixed numbers in software, this term could not be adequately implemented. The encoder velocity is here calculated by differencing successive encoder readings. This value is employed along with the differentiated strain gauge signal to calculate the acceleration of the output shaft. In the Figure, the parameter "$F_{gain}$" refers to a gain parameter corresponding to the amount of feedforward used. In an example implementation of the system, the $P_{gain}$ term was set at 1908, the $I_{gain}$ term was set at 977, the $D_{gain}$ term was set at 362, and the time constant, $\tau$ was set at 11.86 sec. Root locus techniques were used to select these gain values specifically to achieve fast performance and reasonable damping while not setting the gains at such a high level that system noise could become intolerable.

Considering practical issues relating to the control system, it may be preferable in some cases to carry out the differentiation of the force sensor readings, e.g., strain gauge readings, using an analog circuit. For example, in the case of a motor board consisting of a Motorola 6811, the 6811 A/D converter is only 8 bits-wide, and so analog differentiation signals of the strain gauge tends to reduce the errors caused by differentiating small signals in software. The encoder reading on the 6811 is 16 bits-wide, and changes enough during normal operation to accommodate software differentiation. To further accommodate this condition, the effective sampling frequency of the encoder may be set at a level of say, e.g., 250 Hz. Note that the 6811 carries out fixed-point arithmetic, which is why there are several "divide by 256" terms included in the control scheme.

In alternative schemes, the entire control system may be provided as an analog circuit, combination of analog and digital circuitry, or combination of software and analog or digital circuitry, as will be understood by those skilled in the art.

The strain gauge sensor signals were found to preferably be converted to at least a 16 bit-wide signal for the feedback loop calculations, and correspondingly, 16 bit-wide, or larger, gain values are preferred. The output from the feedback loop is in the form of an 8 bit-wide value indicating, e.g., the motor current. Alternatively, the output could indicate the motor voltage, or other suitable motor control parameter. This value is input to the feedforward motor model, which then produces an 8 bit-wide pulse-width-modulation (PWM) duty cycle command to the motor, along with a 1 bit-wide direction control command applied to the motor.

The motor is driven by an H-bridge, using, e.g., a PWM driver at, e.g., 48 V and 31.25 kHz, or may employ another suitable driver. The feedforward model is used to determine the correct voltage to be applied for ensuring that the motor current, or voltage, and corresponding torque, follows that commanded by the control system. Note that the control system in FIG. 9 includes terms for the motor resistance and back emf, but could also preferably include a term for the motor inductance.

Figure 10A:
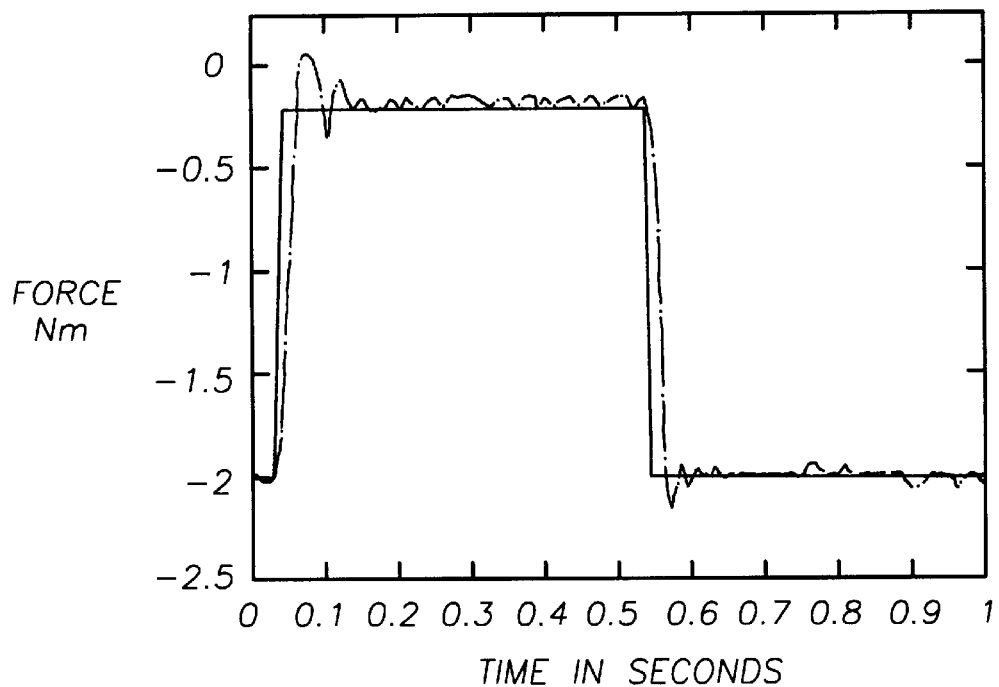
FIGS. 10A–10E are plots of force generated by an elastic actuator in accordance with the invention in response to a force command, as a function of time.
Figure 10B:
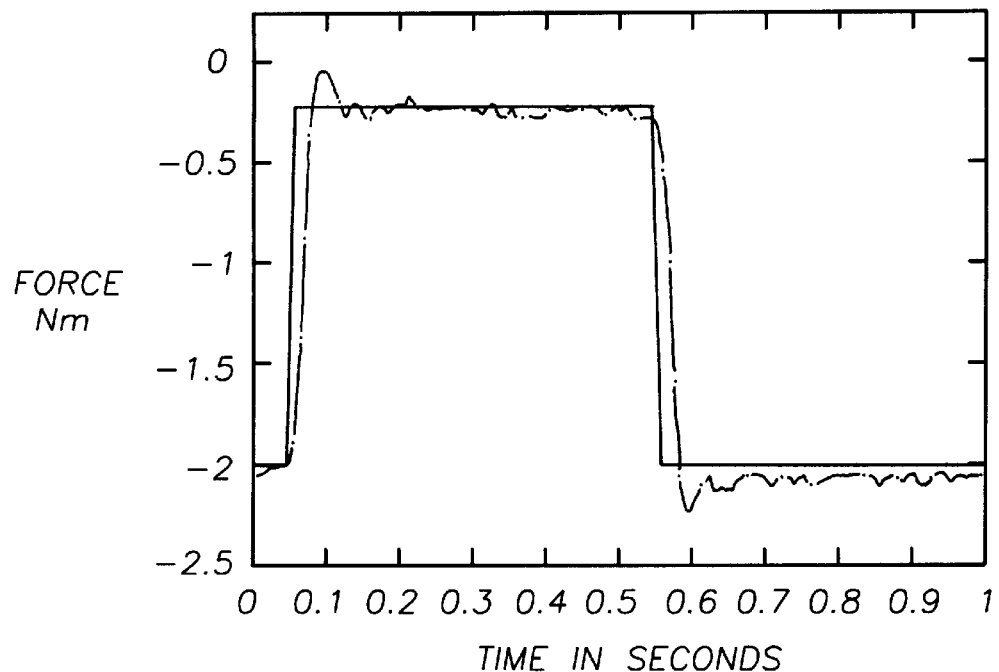
Figure 10C:
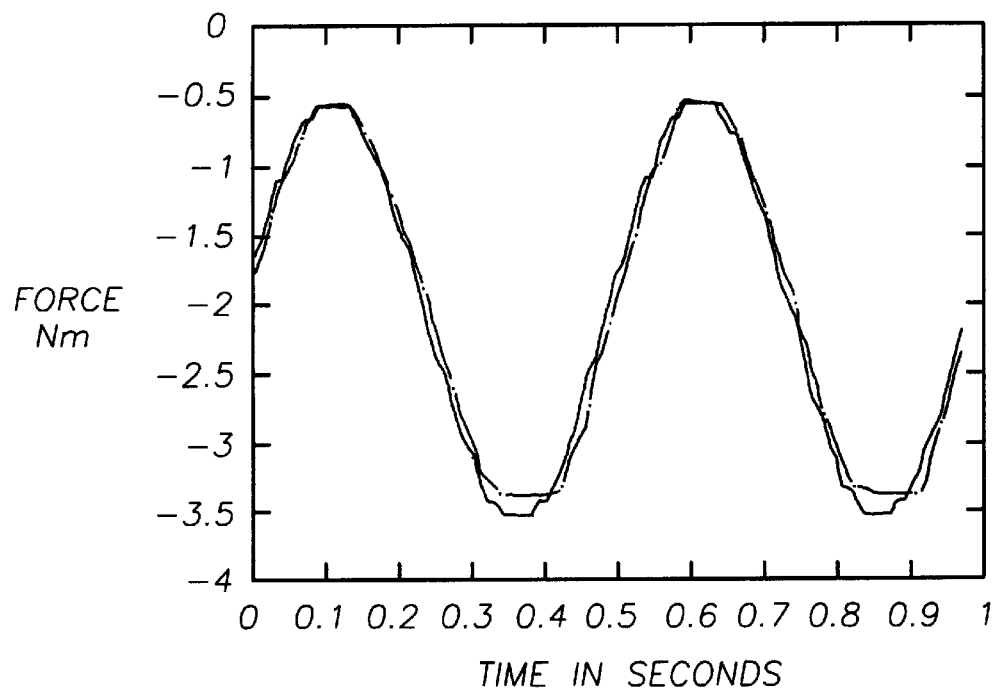
Figure 10D:
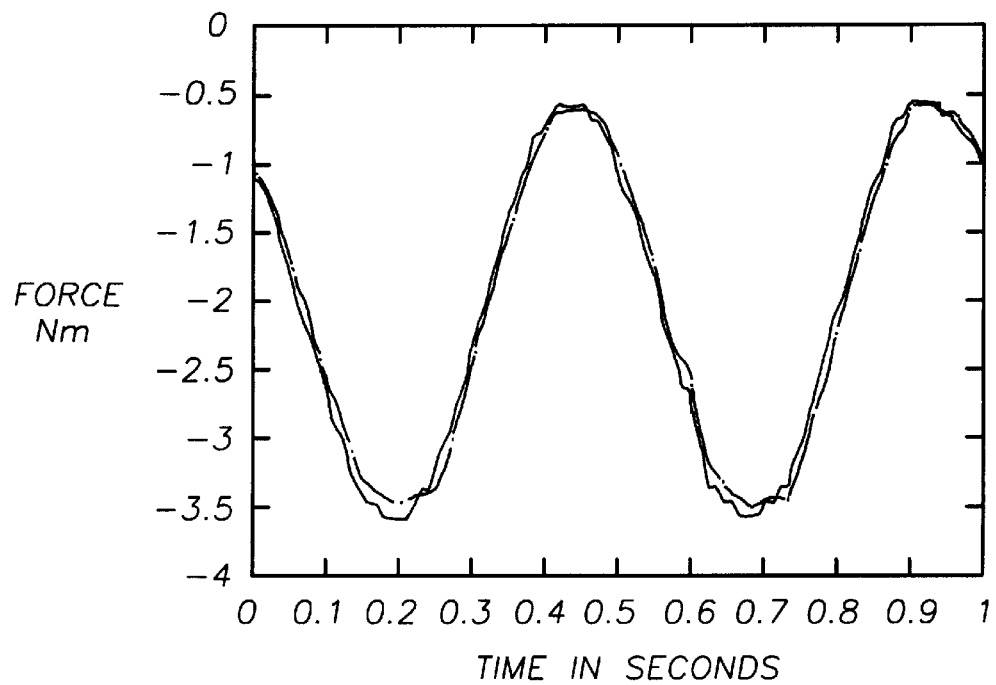
Figure 10E:
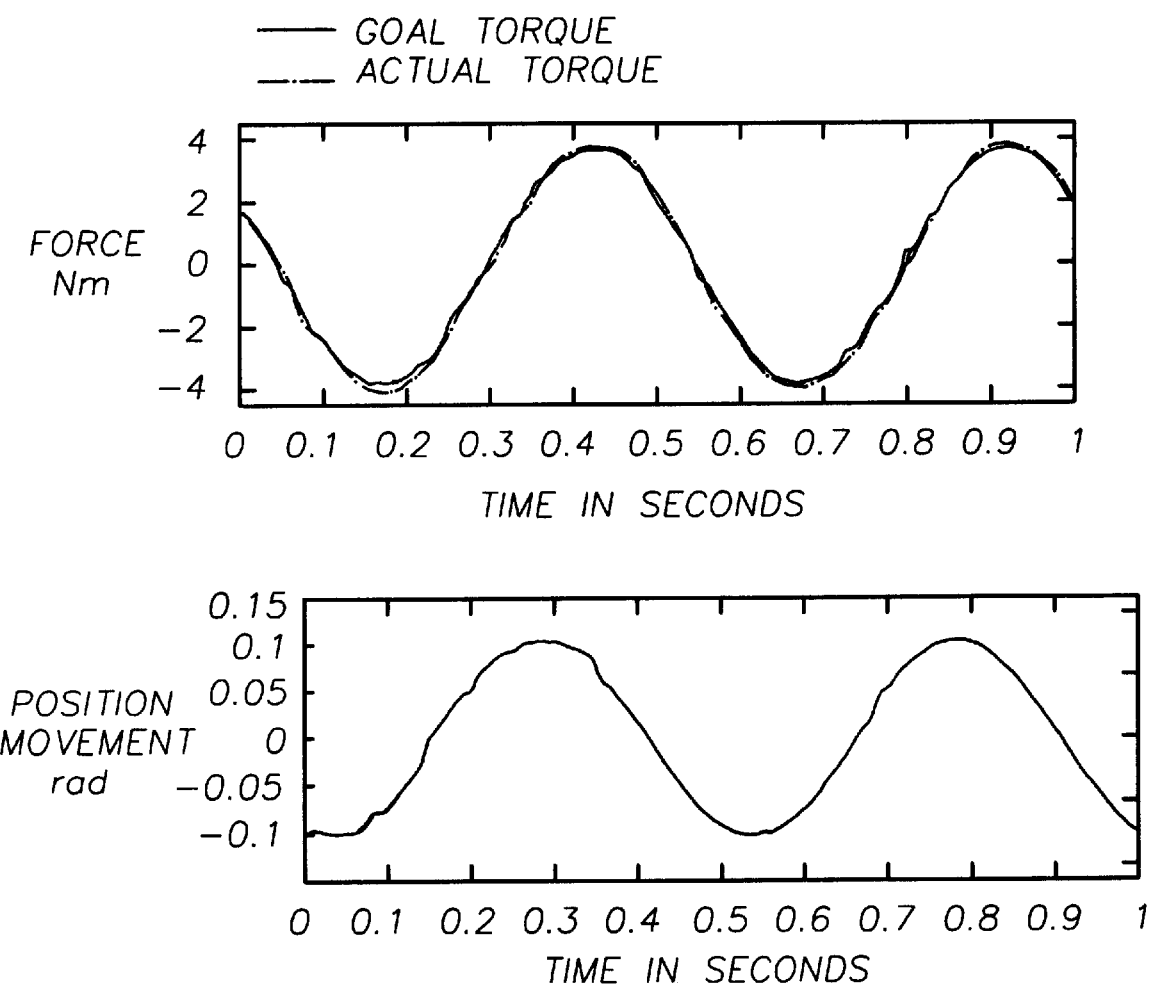

The torque control provided by the elastic actuator of the invention in the example embodiment shown in FIG. 2 is found to be superior to conventional actuator schemes that do not employ a series elastic element. FIG. 10A illustrates the elastic actuator response to a square wave in commanded torque when the actuator load element is in contact with a hard surface, e.g., an aluminum surface. Similarly, FIG. 10B illustrates the elastic actuator response to a square wave in commanded torque when the actuator load element is in contact with a soft surface, e.g., rubber. Although the response for the soft surface case is slightly less damped than for the hard surface case, neither response exhibits the instability commonly exhibited by actuators during this test. FIG. 10C and 10D illustrate the elastic actuator response to a sine wave in commanded torque for a hard surface and soft surface, respectively, and FIG. 10E illustrates the force control performance for following a sine wave command when the output shaft of the actuator, i.e., the load element, is also moving.

Consideration must be given to the impact of the motor movement in response to a force control command while the actuator output is moving, as shown in the figure.

When the output of the actuator is moving, the motor must not only move to achieve a desired spring compression or twist, but also move along together with the output such that a constant force is maintained at the output. The actual motor motion is thus in this case the sum of that required to generate the desired force and that required to follow the actuator output path. As the desired torque waveform command and the actuator output motion change in size and phase during normal operation, the extra motor control required to accommodate this motion may add either constructively or destructively to the actual motor motion, either increasing or decreasing the bandwidth of the force control.

In contrast, in the case of a conventional, stiff actuator, the only motion required of the motor shaft is that of the actuator output, e.g., that of an actuator output shaft. Based on the expressions for system impedance, Z, discussed above, it is found that for low frequencies of actuator output motion, the elastic actuator of the invention provides a much wider dynamic range, i.e., range between minimum force and maximum force, than that provided by a stiff, conventional actuator. As the frequency of output motion increases toward the characteristic natural frequency of the elastic actuator, there then exists a wide range of impedances for which the elastic actuator performs better than a corresponding stiff actuator. At relatively high frequencies, the elastic actuator behaves like a spring, and so is substantial better at generating the necessary impedances than a corresponding stiff actuator.

Figure 11:
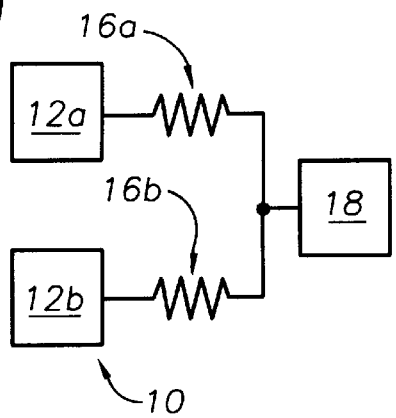
FIGS. 11 and 12A–12B schematically illustrate three alternative elastic actuator configurations in accordance with the invention.

The bandwidth over which the elastic actuator outperforms a corresponding conventional, stiff actuator may be made more broad using an adaptation of the elastic actuator design as shown in FIG. 11. Here the elastic actuator 10 consists of, e.g., two spring elements 16a, 16b, connected in parallel between corresponding motors 12a, 12b and a load element 18, or may include more than two elastic elements. Each spring element preferably is characterized by a different spring stiffness. One of the motor-spring combinations may be specified with, e.g., a low stiffness spring, to provide superior low-frequency behavior, while the other spring may, e.g., be stiffer, for providing superior high frequency behavior. Such a multi-spring/motor actuator scheme is able to provide a wide-bandwidth system response because the springs together provide a non-stiff coupling between the motors and the load, thereby effectively isolating each motor from the load.

Figure 12A:
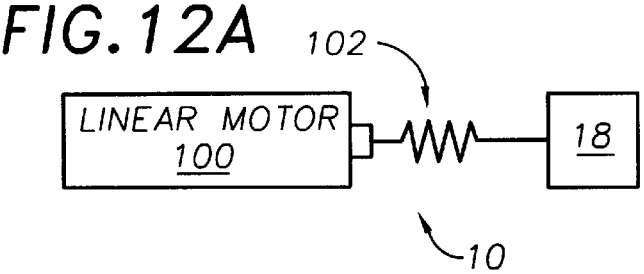

Clearly the superior force control, compliance, stability, and shock protection provided by the elastic actuator of the invention lends the actuator to a wide range of applications. For example, the elastic actuator is well-suited for use as a robot arm, hand, or leg, along with many other actuation applications in which unstructured environments are to be interfaced. While the discussion above primarily focused on a rotary actuator design employing a torsional spring, many other elastic actuator designs are contemplated by the invention. For example, as shown in FIG. 12A, a linear motor 100 and linear spring 102 combination may be employed with a load end element 18 in an elastic actuator in accordance with the invention. Here, a lead screw (not shown) or other mechanism may be employed to couple the motor with the spring element.

Figure 12B:
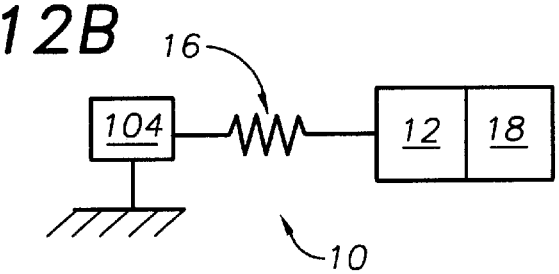

In an alternative embodiment, applicable to both linear and rotary drive actuators, the motor mechanism be itself be supported as an end element by the actuator spring. This scheme is illustrated in FIG. 12B. Here, one end of the spring is attached to ground by way of, e.g., a grounding block or plate 104. The other end of the spring is linked to a motor 12, perhaps through a transmission. The motor 12 is in turn connected to the actuator load element 18. In this case then, the spring element supports the weight of both the actuator load and the actuator motor. This arrangement may be employed for either rotary or linear motor-based elastic actuators.

Figure 13:
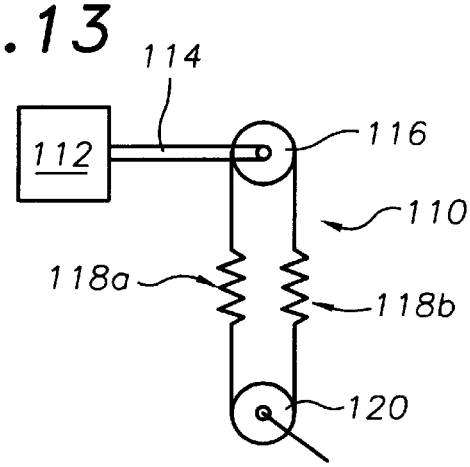
FIG. 13 schematically illustrates a pulley-based elastic actuator in accordance with the invention.

Turning to FIG. 13, there is shown an alternative elastic actuator in accordance with the invention. Here a pulley-based elastic actuator 110 is formed of a motor 112, such as a rotary motor, connected by way of, e.g. a shaft 114, to a pulley system. The pulley system provides a drive pulley 116 connected by way of one or more elastic spring elements 118a, 118b, to a load pulley 120. Rotation of the motor shaft 114 acts to turn the drive pulley 116 and exert a force to the load pulley by way of the springs 118. The springs may be made up of, e.g., standard linear spring material; and if desired for particular applications, only one spring need be positioned along the pulley line between the drive and load pulleys, on either of the sides of the pulley line.

This elastic pulley actuator scheme may be adapted like those just discussed by way of attaching a load pulley, rather than the drive pulley, at the motor end of the actuator system and supporting both the load pulley and the motor by the spring element or elements.

In general, there are many other alternative embodiments of an elastic pulley actuator like that discussed above, where a cable, or tendon, may be employed, as in the pulley system, to transmit torque between the output of a motor transmission and a joint some distance away from the motor. This scheme has the advantage of keeping the mass, and corresponding inertia, of the motor and its attending gearbox away from the joint. By locating the motor remotely the robot structure has less inertia and is lighter, and accordingly, has less inertia to support and can accelerate more quickly. In such an elastic tendon system, a series spring element may be provided by the elasticity of the tendon cable itself, or, if this elasticity is insufficient for a given application, may be achieved by inserting elastic elements, e.g., extension springs, in series with the cable, as shown in the figure. Because tendons can in general not provide compressive force, it is necessary to employ an elastic element in series with each of two cables if achievement of bi-directional torque is desired. In this case, in general, it is preferable that the cable loop be tensioned to slightly more than one-half of the expected applied force, so that under maximum torque in either direction, neither cable will go slack.

An ancillary advantage provided by series elasticity in a tendon system is that the elastic element tends to lower the overall sensitivity of the system to tendon stretching. Typically, tendons stretch as they age. With an added spring element, any elasticity in the tendon is dominated by that of spring element, whereby small changes in tendon length do not significantly alter the tendon tension.

The torque generated by a series spring element in a tendon system may be sensed by transducing tension of a tendon. This may be accomplished directly by a series element, or may be accomplished indirectly by, e.g., an idler wheel that deflects the tendon and measures the perpendicular force applied. Note that although two tendons and two elastic elements may be employed for a given application, the force control scheme of the invention requires only that the tension on at least one tendon side be measured. If a series force transducer is employed in a tendon system, it is preferable to place the force transducer close to the final attachment point of the tendon, whereby the motion of the transducer relative to the final supporting link is small, and accordingly, wires with a small amount of play may be attached.

The force transducer for a tendon system may be embodied as any of the force transducers described previously, e.g., as a strain gauge, or alternatively, may employ a stretch transducer. Such a stretch transducer is provided by, e.g., a potentiometer, a strain gauge, a conventional hall effect sensor, or any other type of position transducer that may be mounted directly across the spring element. Alternatively, an idler wheel exhibiting frictional contact with a tendon may be positioned along a tendon between the motor and the spring element for sensing motion relative to the final attachment point. Such an idler wheel may be connected with only one side of the tendon or with both tendons. Several examples of such schemes using an idler wheel will be illustrated in turn below.

In all such actuator systems employing an idler pulley configuration in accordance with the invention, an actuator output link is supported by, e.g., a revolute bearing connecting the output link to the idler pulley by way of its shaft. Tendons are connected between a capstan positioned at the output of a motor gear train and the idler pulley, around which they are wrapped. One or more series spring elements are positioned between the idler pulley and the attachment point of the cable on the output link. Alternatively, the spring element may be placed between the idler pulley and the capstan, in which case, the idler pulley is preferably rigidly attached to the output link. In this configuration, a force transducer must be positioned to move with the tendon, however, while in the first case given, a force sensor may be positioned fixedly with respect to the output link.

Figure 14A:
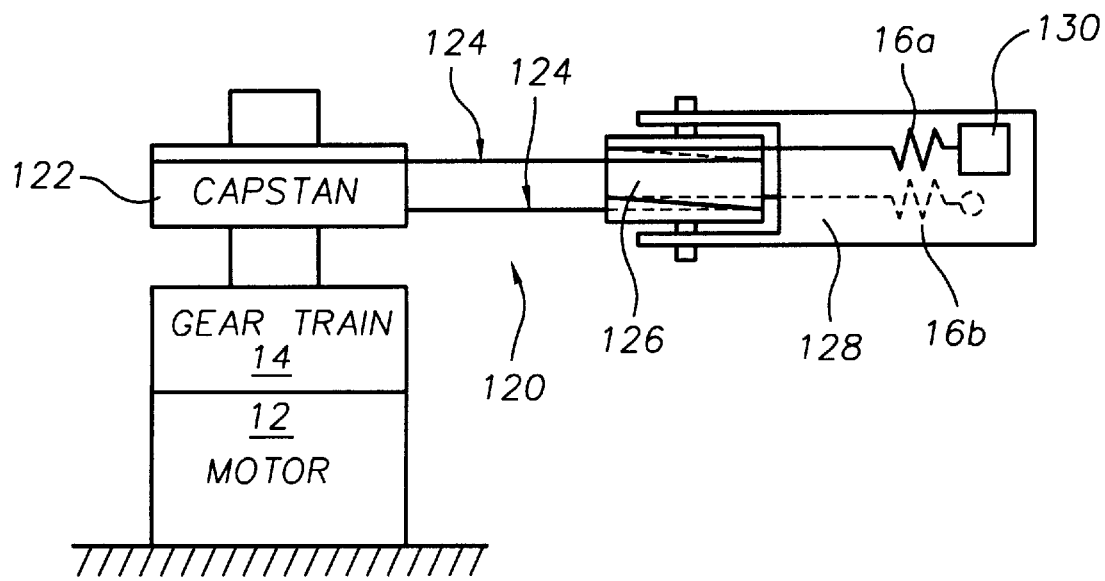
FIGS. 14A–14F schematically illustrate examples of force sensing configurations for an elastic tendon actuator in accordance with the invention.

Turning now to FIG. 14A, in a first pulley-tendon elastic actuator 120, a capstan 122 supports a tendon 124 wrapped around an idler pulley 126 and then connected to an actuator output link member 128. Series spring elements 16a, 16b are positioned along the tendon and connected to the link member. In a first force transduction technique, the stretch of spring elasticity is directly measured by way of a linear transducer 130 connected across the elasticity. Such a transducer may embody, e.g., a potentiometer, digital encoder, hall effect proximity sensor, or other position transducer. Note that the sensor measures only spring motion, not overall motion of the entire actuator system. If 5 insensitivity to changes in overall tendon length is desired, as might be produced by, e.g., machining tolerances, two transducers may be used on both spring members, and the outputs subtracted by a standard differential amplifier provided by a section of the force control loop.

Figure 14B:
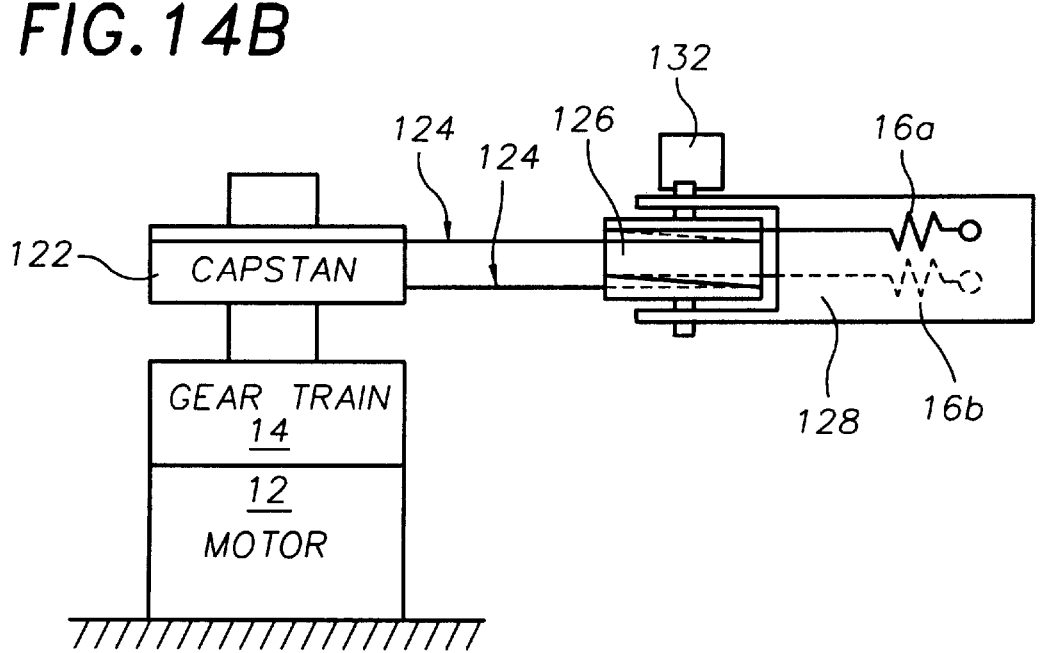

In a second tendon-idler pulley elastic actuator, shown in FIG. 14B, the revolute motion of the idler pulley is measured with respect to the actuator output link position to determine the actuator spring stretch and corresponding force. In this case, when the series spring members stretch differentially, the idler pulley experiences motion relative to the output link. This relative motion may be detected by a revolute transducer 132, embodying, e.g., a potentiometer, digital shaft encoder, or other suitable rotary transducer. Alternatively, an additional idler pulley (not shown) may be mounted, by way of a bearing, to the output link in frictional contact with one or both of the tendon sides between the idler pulley and the spring members; a shaft encoder or other rotary sensor is then employed to sense relative motion of this second pulley.

Figure 14C:
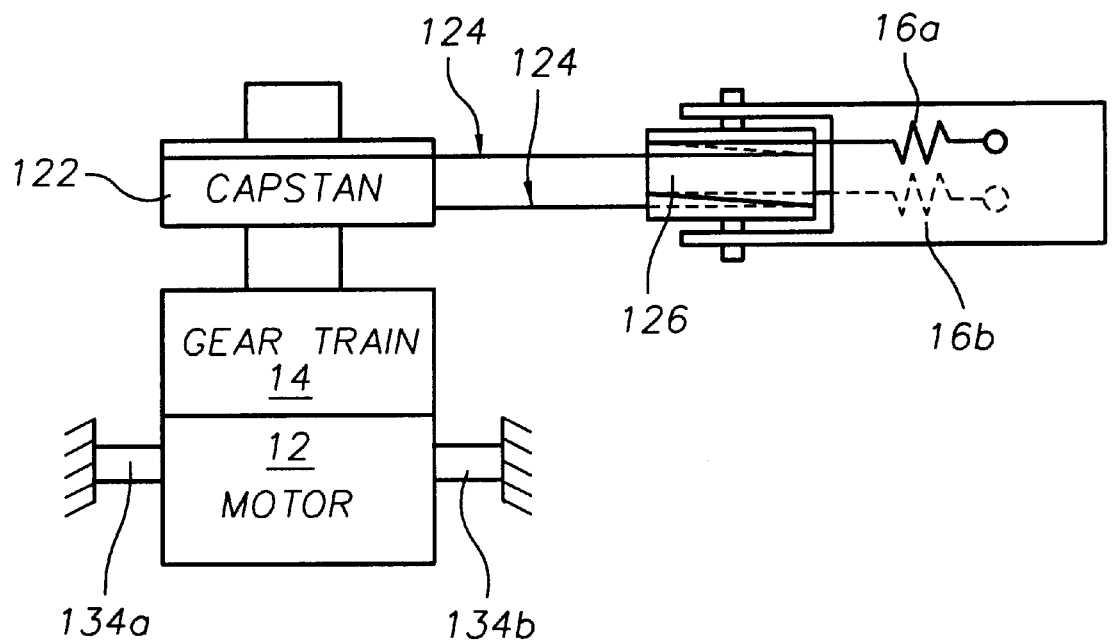

Turning now to FIG. 14C, there is shown an elastic tendon actuator in which torque is measured by measuring the reaction torque of the motor 12 and gear train 14. This is accomplished using strain gauges 134a, 134b positioned at the motor housing 12. This configuration provides an advantage in that the sensors never move, but has the disadvantage that torque components due to the inertia of the motor are included in the measurement. Such torque components can be removed from the force measurement by conventional compensation techniques in the feed forward loop of the control system. An additional advantage provided by this configuration is the flexibility to position a series spring member 16a, 16b, either before or after the idler pulley 126.

Figure 14D:
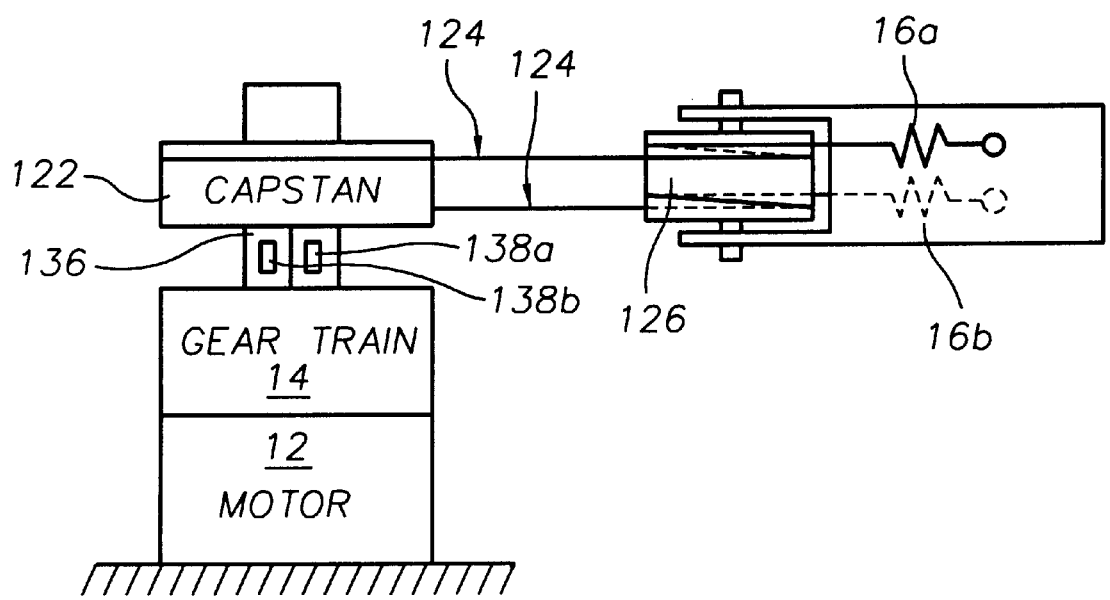

Alternatively, as shown in FIG. 14D, a torsion spring 136 and associated strain gauges 138a, 138b may be positioned with respect to the linkage between the gear train 14 and capstan 122 to sense force in the actuator system. Such a torsion spring 135 may take a form like that of the torsion springs previously discussed, or any suitable form. Like the design of FIG. 14C, this design provides flexibility in positioning the series springs either before or after the idler wheel. The combination torsion spring and the series elastic tension springs together provide the ability to tailor the overall actuator compliance provided by each of the springs. For example, in one limit, all of the system compliance may be provided by the torsion spring, in which case the tension springs are not needed. At the other extreme, the torsion spring may be very stiff and the tension springs may provide substantial compliance. Any balance between these extremes may be selected to achieve a desired compliance balance for any given application.

Figure 14E:
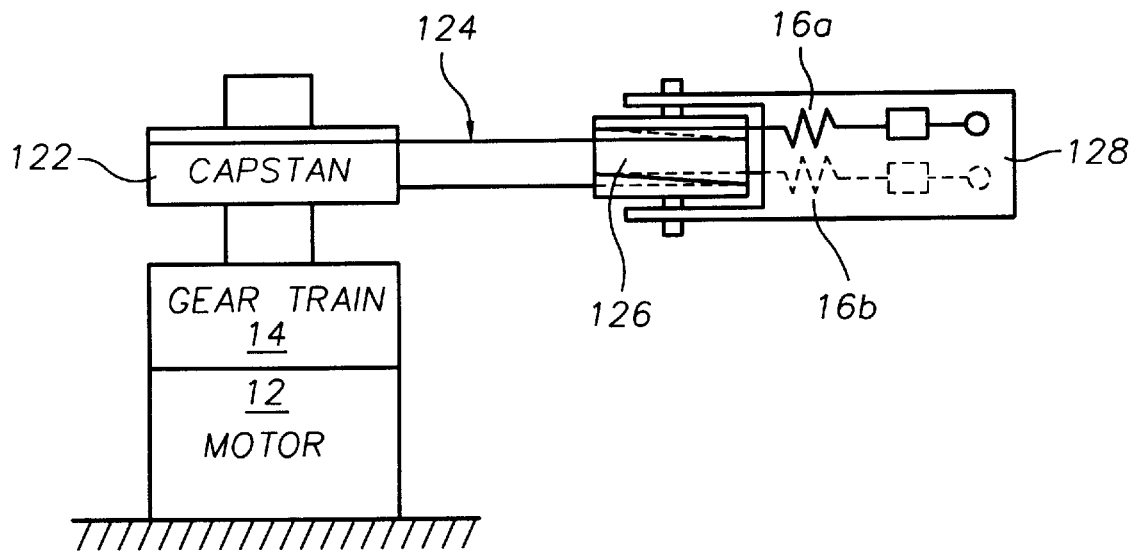

A direct tendon tension measurement may alternatively be employed as shown in FIG. 14E. Here one or two load cell strain gauges 140 are connected between the end of the tendon and the output link member 128. If insensitivity to common-mode changes in overall cable tension is desired, the output of two such strain gauges may be subtracted by a differential amplifier, as discussed above. Alternatively, the strain gauges, which are usually configured as a bridge, may be distributed on both sides of the output link 128 such that differential subtraction occurs in the bridge itself.

Figure 14F:
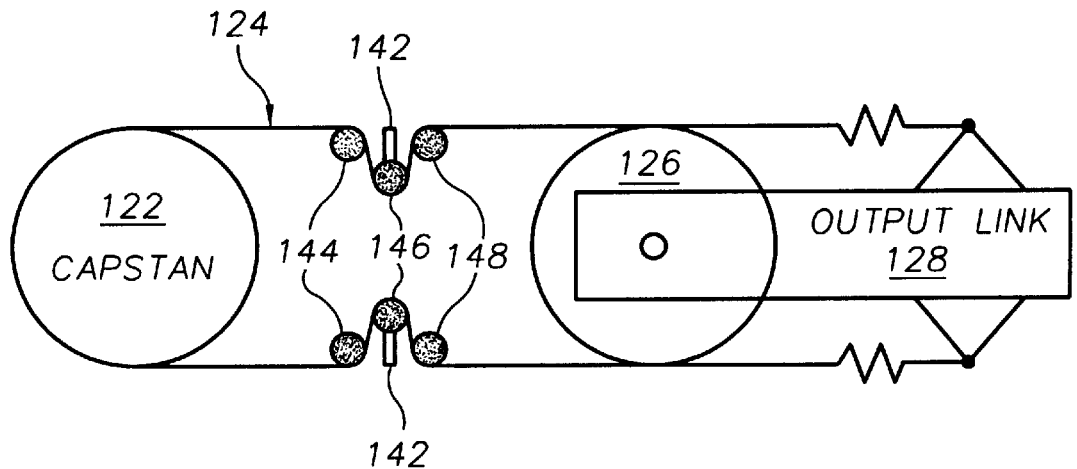

In a final example, shown in FIG. 14F, the system force is determined by the force required to deflect the tendon. Such a perpendicular force is directly related to the tension in the tendon. The measurement may be accomplished by, e.g., strain gauges 142 positioned along the tendon at a point where a perpendicular force is introduced by way of, e.g., pulleys 144, 146, and 148. The pulley arrangement may be located at any point along the tendon. Use of two strain gauges may be employed to achieve insensitivity to common mode tension changes in the two tendon sides.

Other elastic tendon configurations are within the scope of the invention. The invention is not limited to specific tendon configurations or types of configurations; but rather, is characterized by configurations that provide series elasticity, the ability to measure tension in the tendon system, and the ability to produce force by way of the series elasticity.

From the foregoing, it is apparent that the elastic actuator designs, force control schemes, and spring configurations described above not only achieve improved actuator force control, among other advantages, but do so in a particularly effective and efficient manner. It is recognized, of course, that those skilled in the art may make various modifications and additions to the preferred embodiments described above without departing from the spirit and scope of the present contribution to the art. Accordingly, it is to be understood that the protection sought to be afforded hereby should be deemed to extend to the subject matter of the claims and all equivalents thereof fairly within the scope of the invention.

We claim:

1. An elastic actuator having force control, the actuator comprising:
   a motor;
   a motor drive transmission connected at an output of the motor;
   at least one torsional spring connected in series with the motor drive transmission, the at least one torsional spring positioned to fully support along either direction of an actuation axis, a load connected at least one output of the actuator, as the load is actuated along either direction the actuation axis, the torsional spring comprising a flexible structure having at least three flat segments, each segment connected integrally with and extending radially from a central section, and each segment extending axially along the central section from a distal end of the central section to a proximal end of the central section;
   a single force transducer positioned at a point between a mount for the motor and at least one output of the actuator, the force transducer generating a force signal indicating force applied by the torsional spring to at least one output of the actuator; and
   an active feedback force controller connected between the torsional spring and the motor for controlling the motor, based on the force signal, to twist the torsional spring an amount that produces a desired actuator output force, the output force being substantially independent of load motion.

2. A torsional spring comprising a flexible structure having at least three flat segments, each segment connected integrally with and extending radially from a central section and each segment extending axially along the central section from a distal end of the central section to a proximal end of the central section, the connection of each segment to the central section having a fillet radius that is less than about a maximum radius, $r_{max}$, which is inversely proportional to a maximum sustainable spring torque that is about the same as that maximum sustainable torque corresponding to a flat plate torsional spring having a width about equal to a sum of radial lengths of the flat segments.

3. The torsional spring of claim 2 wherein the flexible structure comprises steel.

4. The torsional spring of claim 2 wherein the flexible structure has four flat segments each connected integrally with the central section at a right angle with respect to adjacent flat segments.

5. The torsional spring of claim 4 further comprising a first mounting block integrally connected with the distal end of the central section and a second mounting block integrally connected with the proximal end of the central section.

6. The torsional spring of claim 5 wherein the first and second mounting blocks each comprise a central annulus.

7. The torsional spring of claim 4 further comprising a cylindrical section extending from the central section proximal end to the central section distal end and integrally connected with a radial edge of each flat segment.

8. The torsional spring of claim 2 wherein the connection of each segment to the central section has a fillet radius that is less than about a maximum radius, $r_{max}$, which is inversely proportional to a maximum sustainable spring torque that is about 1.25 times the maximum sustainable torque corresponding to a flat plate torsional spring having a width about equal to a sum of radial lengths of the flat segments.

9. The torsional spring of claim 8 wherein the connection of each segment to the central section has a fillet radius that is less than about a maximum radius, $r_{max}$, which is inversely proportional to a maximum sustainable spring torque that is about 1.4 times the maximum sustainable torque corresponding to a flat plate torsional spring having a width about equal to a sum of radial lengths of the flat segments.

10. The torsional spring of claim 2 further comprising at least one strain gauge element mounted on at least one of the flat segments.

11. The torsional spring of claim 10 wherein the at least one strain gauge element comprises at least two strain gauge elements, configured in a half-bridge circuit.

12. The torsional spring of claim 11 wherein the at least two strain gauge elements comprise four strain gauge elements, configured in a full-bridge circuit.

13. The torsional spring of claim 2 further comprising a potentiometer having a shaft connected to communicate with one of the central section distal and proximal ends and a body connected to communicate with the other of the distal and proximal ends.

14. The torsional spring of claim 2 further comprising a shaft encoder having an encoder wheel connected to communicate with one of the central section distal and proximal ends and a body connected to communicate with the other of the distal and proximal ends.

15. The torsional spring of claim 7 wherein the central section comprises an open channel.

* * * * *